(12) United States Patent
Dimitrov et al.

(10) Patent No.: US 10,539,395 B2
(45) Date of Patent: Jan. 21, 2020

(54) ENERGY INSERTION INTO SEEKER (71) Applicant: BAE SYSTEMS Information and Electronic Systems Integration Inc., Nashua, NH (US)

(72) Inventors: Dimitre P. Dimitrov, Wayland, MA (US); Michael J. Choiniere, Merrimack, NH (US); Jason T. Whitwam, Billerica, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 212 days.

(21) Appl. No.: 15/911,561

(22) Filed: Mar. 5, 2018

(65) Prior Publication Data
US 2019/0271526 A1 Sep. 5, 2019

(51) Int. Cl.
F41G 7/22 (2006.01)
F41G 7/00 (2006.01)
G01S 3/78 (2006.01)

(52) U.S. Cl.
CPC .......... *F41G 7/001* (2013.01); *F41G 7/2293* (2013.01); *G01S 3/7803* (2013.01)

(58) Field of Classification Search
CPC ......... G01C 3/08; G01S 3/7803; F41G 7/001; F41G 7/2293
See application file for complete search history.

(56) References Cited

U.S. PATENT DOCUMENTS 7,276,681 B2  10/2007  Alexander et al.
2016/0139249 A1* 5/2016  Levy ............... G01S 7/4913
                                                250/203.2

* cited by examiner

Primary Examiner — Georgia Y Epps
Assistant Examiner — Don J Williams
(74) Attorney, Agent, or Firm — Davis & Bujold, PLLC

(57) ABSTRACT

A system and method for improved detection of lasers for use in laser guidance systems. By providing background illumination via one or more radiation sources the accuracy of the laser detection system can be improved. A closed loop system detects the background current on the detector and provides additional illumination when the back ground level is below a threshold current value thus providing for a faster detector response.

15 Claims, 8 Drawing Sheets

ENERGY INSERTION INTO SEEKER

FIELD OF THE DISCLOSURE

The present disclosure relates to laser devices and more particularly to increasing the sensitivity of laser devices by using the insertion of energy such as from a light emitting diode.

BACKGROUND OF THE DISCLOSURE

Typical approaches for producing high-frequency response from pixel amplifiers in a read out integrated circuit (ROIC) in any background illumination environment is to use high power, large footprint amplifiers. The pixel amplifiers ultimately dictate ROIC size and power, and therefore larger, higher power pixel amplifiers result in a larger footprint, higher power ROICs. Wherefore it is an object of the present disclosure to overcome the above-mentioned shortcomings and drawbacks associated with the conventional laser devices.

SUMMARY OF THE DISCLOSURE

One aspect of the present disclosure is a system comprising a method for improving detection in a laser guidance system, comprising: measuring an initial pixel array background current on a focal plane array; comparing the initial pixel array background current to a threshold current value via a processing unit; and providing a radiation energy level if the initial pixel array background current is below the threshold current value, thereby improving detection in the laser guidance system. The threshold level ensures a steady minimum current level to improve circuit performance. The background scene and the sensor dark current can result in large variations in diode current (over a range of temperatures).

One embodiment of the method for improving detection in a laser guidance system further comprises updating the current pixel array background current at a frequency of about 10 kHz. In certain embodiments, the measurement of the current pixel array background current appears as a serial peripheral interface read-only register to a microcontroller. In some cases, the serial peripheral interface register can be read out at greater than 20 kHz if a serial peripheral interface clock is at 1 MHz.

Another embodiment of the method for improving detection in a laser guidance system further comprises a read out integrated circuit in communication with the focal plane array. In some cases, direct injection or buffered direct injection pixel input configurations are used.

Yet another embodiment of the method for improving detection in a laser guidance system further comprises detecting a laser pulse from a semi active laser pulse having a pulse width of 10 ns or less.

Still yet another embodiment further comprises determining the threshold current value comprising: establishing probable threshold current values during the read out integrated circuit (ROIC) design phase; calibrating the focal plane array by measuring the total background current; testing the sensitivity and speed response for the focal plane array; and updating the threshold current value once the focal plane array has been calibrated.

Another aspect of the present disclosure is a laser guidance system comprising: a focal plane array located within a housing and configured to measure an initial pixel array background current; a processing unit configured to compare the initial pixel array background current to a threshold current value; and one or more radiation sources located within the housing for providing illumination when the initial pixel array background current is below the threshold current value.

One embodiment of the laser guidance system further comprises a lambertian lens retainer for directing the radiation sources. Certain embodiments of the guidance system further comprise one or more lenses wherein one of the one or more lenses comprises a narrow band dichroic filter. In some cases, the processing unit further comprises a microcontroller.

Another embodiment of the laser guidance system the processing unit further comprises a serial peripheral interface. In some cases, the semi active laser guidance system further comprises a read out integrated circuit.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One embodiment of the present disclosure allows using a compact and low power preamplifier design for the detection of high frequency input signals by a sensor. In certain embodiments, using a closed loop system to provide background illumination enables a fast response by the preamplifier. The sensor senses the available background current, and if there is not enough background current, then the system provides additional radiation. According to one embodiment, the systems determines a radiation level for sufficiently fast response, but not enough to diminish sensor sensitivity.

In certain embodiments of the system of the present disclosure the use of smaller and lower power amplifier designs are possible for detecting fast input signals. In some cases, the signals are 10 ns laser pulses. The system may also provide a sensitive edge for other laser sensors in different bands. Other laser bands could be NIR (850, 930, 1064 nm), SWIR band (1.54 and 1.57 µm) and MWIR and LWIR laser.

Figure 1:
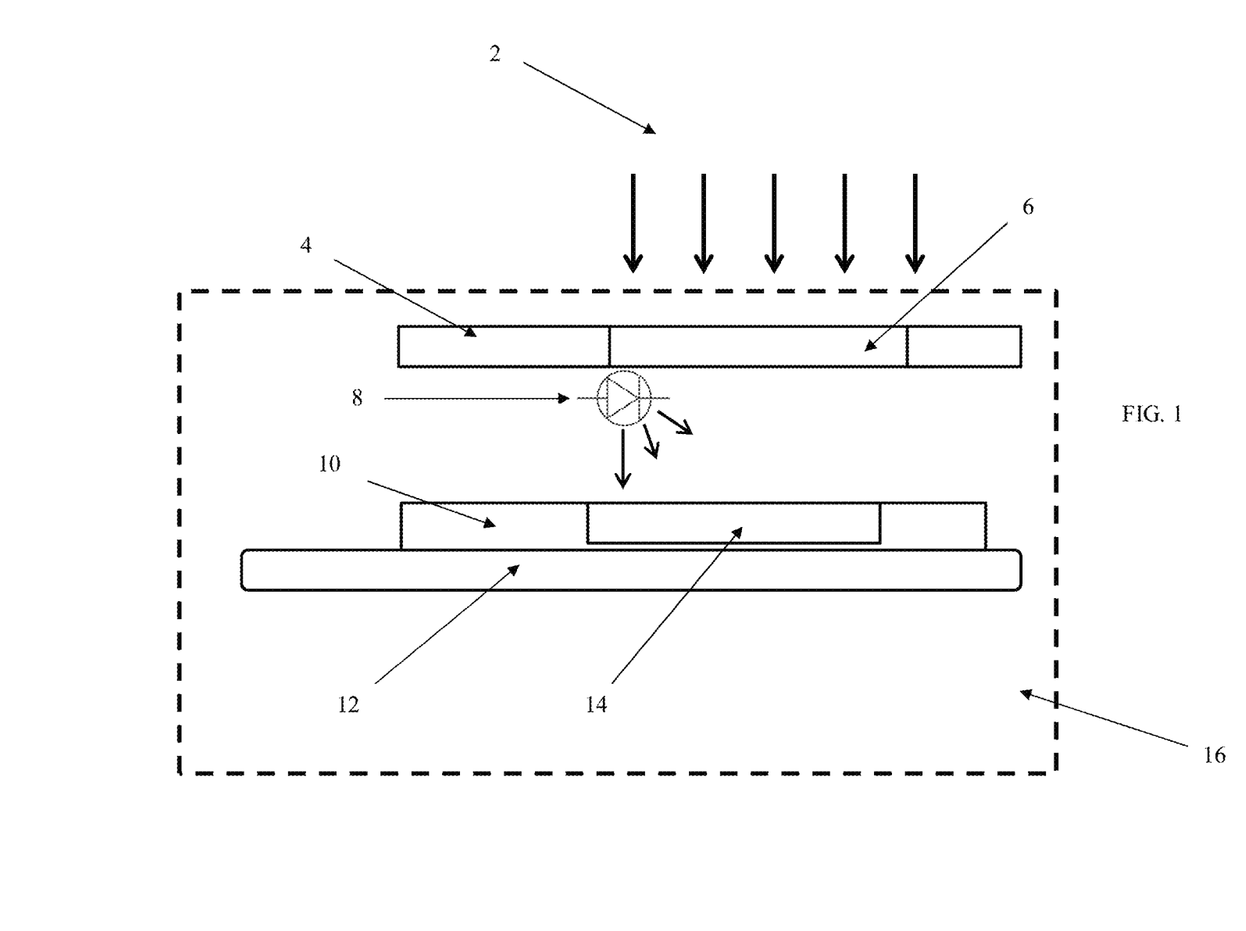
FIG. 1 is a diagrammatic view of one embodiment of the system of the present disclosure.

Referring to FIG. 1, a diagrammatic view of one embodiment of the seeker system of the present disclosure is shown. More specifically, the seeker system 16 takes in signal and scene background radiation 2, which enters through an opening 6 in the seeker system's housing 4. The level of the background current for the focal plane array is determined by the microprocessor 12 that is communicatively coupled to the read out integrated circuit (ROIC) 14. If required, based on a threshold current value, additional radiation energy or illumination 8 is provided. In some cases, the additional illumination is provided by LEDs or laser diodes. In certain embodiments, the focal plane array (FPA) 10 is electrically connected to a read out integrated circuit (ROIC) 14. The ROIC 14 is in communication with the processing unit 12. In some cases, the processing unit includes a microcontroller, a FPGA, or both.

It is to be understood that an initial sensor current is measured and that initial current is variable due to temperature and/or background illumination, this method applies a minimum current threshold value for which additional illumination, or radiation energy, is added to the system to provide for increased sensitivity of the detector. The initial current can fluctuate due to changes in temperature (e.g., if it is colder, the current is lower) or by the ambient illumination (e.g., if it is darker, then the current will be lower as compared to bright sunlight). The temperature fluctuation can depend not only on the location of the sensor (e.g., out in the hot sun), but also on the type of detector material.

The frequency response of the preamplifier in one example depends upon its background current as it needs a minimum amount of current to register. In some embodiments, the system of the present disclosure provides an LED to provide a minimum level of background illumination to ensure that the preamplifier is biased correctly. In some cases, the read out integrated circuit (ROIC) provides the ability to estimate the scene background signal. A purpose for the ROICs is to accumulate the photocurrent from each pixel and then transfer the resultant signal onto output taps for readout. Conventional ROIC technology stores the signal charge at each pixel and then routes the signal onto output taps for readout. This requires storing large signal charge at each pixel site and maintaining signal-to-noise ratio (or dynamic range) as the signal is read out and digitized. In certain embodiments of the system of the present disclosure, the amount of background illumination affects the gain, especially at the lowest amount of light. One aspect of the system of the present disclosure is to provide sufficient background light energy necessary for a fast response and fast settling times, but not enough to degrade sensor performance.

In one embodiment of the system of the present disclosure, the radiation energy from the laser diode or LED is placed within the housing and directed towards the focal plane array but configured to provide uniform distribution of the energy. This can be accomplished by multiple energy sources around the sensor periphery, each contributing a portion of the illumination reflected off a dome reflector e.g., 40, FIG. 3 or a single energy source using a waveguide light pipe distribution such as is used in LCD displays (not illustrated). In another example there are four radiation sources located around the periphery of a window and each source is directed towards the center of the focal plane array. The radiation sources can be coupled directly to the interior of the housing with the power signals wired from the seeker to the radiation sources. In yet another example the radiation sources have independent power from a battery or from energy harvesting source such as Peltier effect based on the temperature differences.

One embodiment of the system of the present disclosure provides a closed loop system that takes measurements of the initial pixel array background current and adjusts the radiation energy level such as provided by at least one LED. In some cases, the array background current is digitized and the background measurement appears as a serial peripheral interface (SPI) read-only register to the processing unit such as the microcontroller. In some embodiments, the scene changes at a frequency of less than 1 kHz. In some cases, the background current measurement is updated at a frequency of greater than 10 kHz and the SPI register is readout at a frequency of greater than 20 kHz if the SPI clock is at about 1 MHz.

By adding sufficient radiation or light energy as background illumination, as in the present disclosure, the minimum amount of signal necessary to ensure a high-frequency response in a focal plane array (FPA) is provided without requiring a larger, power hungry amplifier in each pixel. Pixel input amplifiers isolate the focal plane array detectors from the rest of the pixel amplifiers, keeping the detectors properly biased and allowing the signal to be captured efficiently. The pixel preamplifier keeps detectors biased properly by allowing input signal to flow easily to the rest of the pixel. If the preamplifier is unable to respond to an input signal, then the signal would remain on the detector and would change the bias voltage of the detector. The signal would eventually be collected by the pixel amplifiers, and while the overall amount of charge would remain constant, the frequency and amplitude aspects of the signal would be lost. The performance of some FPAs can vary with background illumination. The system of the present disclosure provides the necessary background illumination to provide higher performance. In some embodiments, a higher background illumination injects a larger amount of current into the pixel input, which can enable higher frequency operation of the pixel unit cell. Two applications are Direct Injection (DI) and Buffered Direct Injection (BDI) pixel input configurations. The response of simpler input circuits like DI or BDI depends upon the background signal. Using DI and BDI circuits for high frequency operation of pixels enables smaller pixels and saves power.

Figure 2A:
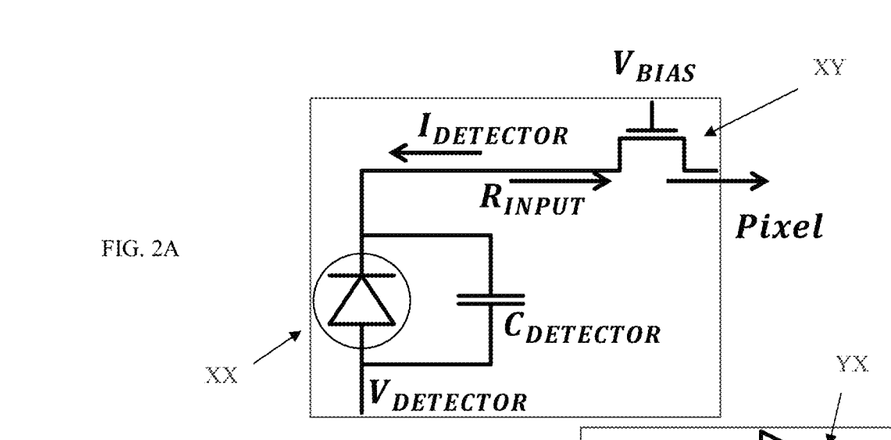
FIG. 2A is a diagrammatic view of one embodiment of the system of the present disclosure using direct injection pixel input.
Figure 2B:
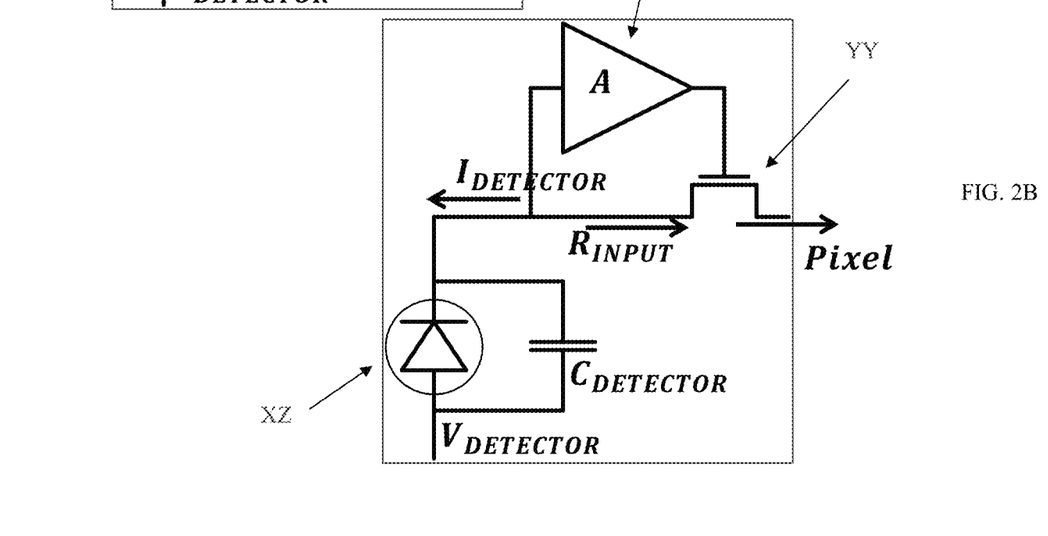
FIG. 2B is a diagrammatic view of one embodiment of the system of the present disclosure using buffered direct injection pixel input.

Referring to FIG. 2A, a diagrammatic view of one embodiment of the system of the present disclosure using direct injection pixel input is shown. More specifically, the FPA photodiode XX is biased by a direct injection transistor XY, which is biased by $V_{BIAS}$. Referring to FIG. 2B, a diagrammatic view of one embodiment of the system of the present disclosure using buffered direct injection pixel input is shown. More specifically, the photodiode XZ is biased by the buffered injection transistor YY in conjunction with the amplifier YX.

The input impedance of DI and BDI Readout Integrated Circuit (ROIC) pixel input configurations depends upon the amount of input signal. The input impedance affects how fast the circuit responds to the input signals. In certain embodiments, by providing a certain amount of background illumination (or signal) this ensures the pixels will have a high frequency response. In some embodiments, the system increases the responsivity of the detector array. Monolithic silicon detector performance is forecasted to be better than InGaAs in some cases; depending on detector implementation and size.

Figure 3:
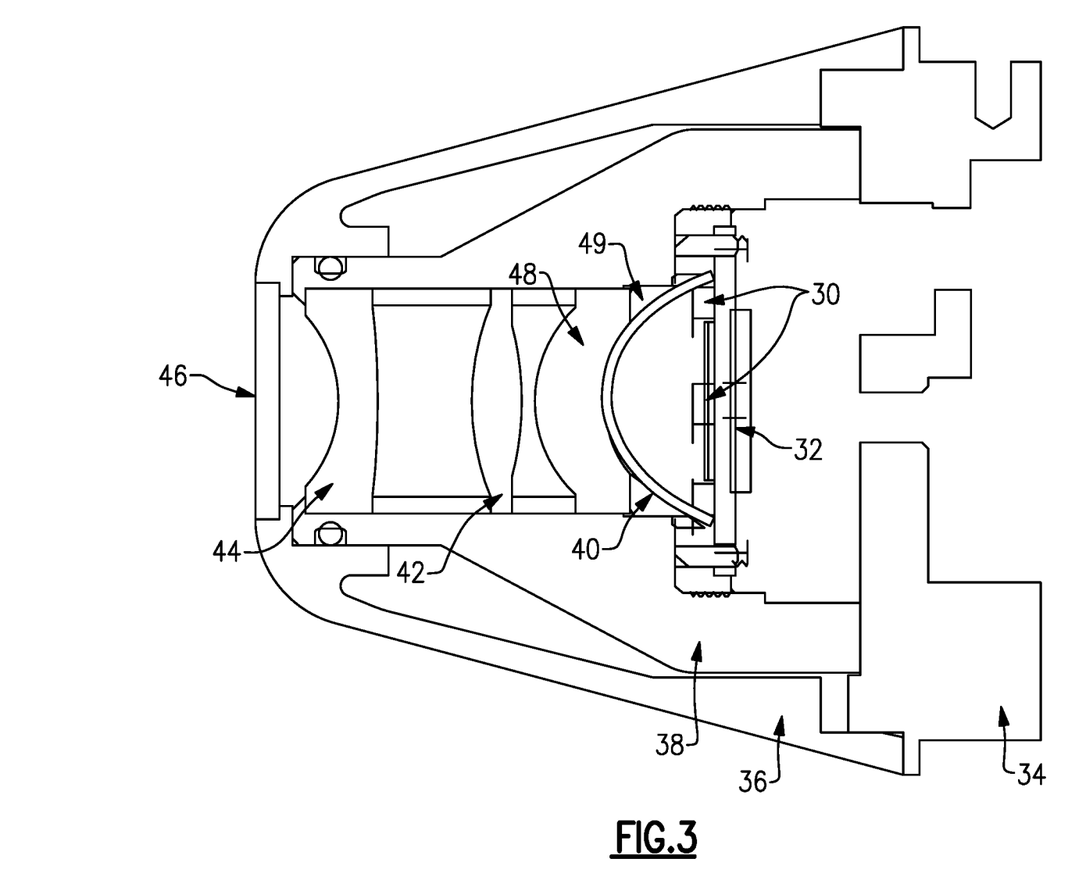
FIG. 3 shows one embodiment of the system of the present disclosure.

Referring to FIG. 3, one embodiment of the system of the present disclosure is shown. More particularly, one embodiment of the system of the present disclosure uses a half integrating sphere design, or "cloudy day" design. The design uses a combination of a lambertian scattering lens retaining ring and a narrow band dichroic coating on the inside of the last lens element. In one case, additional illumination is provided by 4 LEDs. The LEDs 30 are illuminating the arch mirror 40 comprised of two components. The first surface of lens 48 and the mirror surface of the lens retaining ring 49. The arch mirror 40 acts as dome retro reflector and directs the LED 30 energy back onto the sensor array 32. The other elements it the figure are lens assembly (44, 42, 40, 46) and the housing (38, 36, 34).

Figure 4A:
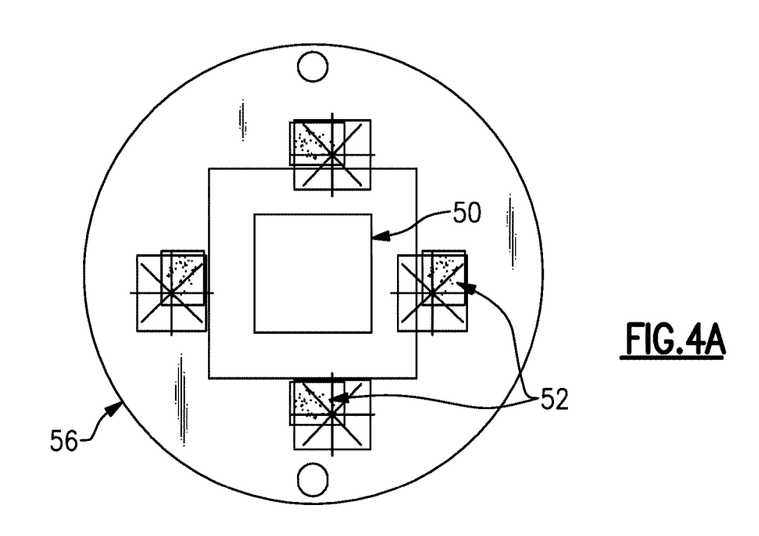
FIG. 4A shows a bottom view of one embodiment of the system of the present disclosure as shown in FIG. 4B and FIG. 4C.
Figure 4B:
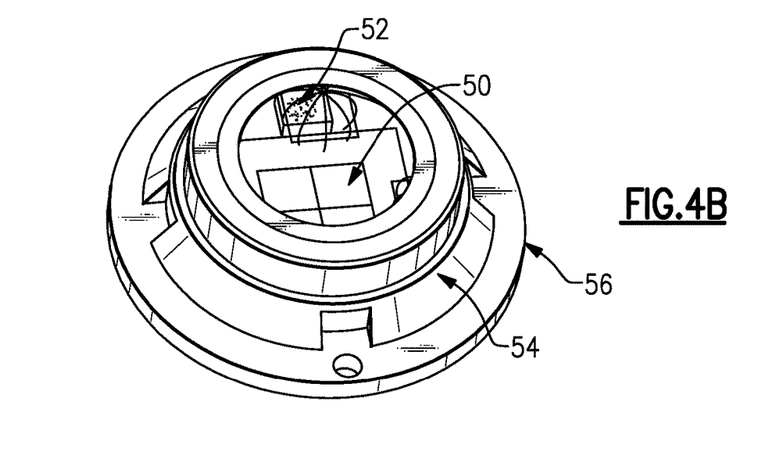
FIG. 4B shows a perspective view of one embodiment of the system of the present disclosure as shown in FIG. 4A and FIG. 4C.
Figure 4C:
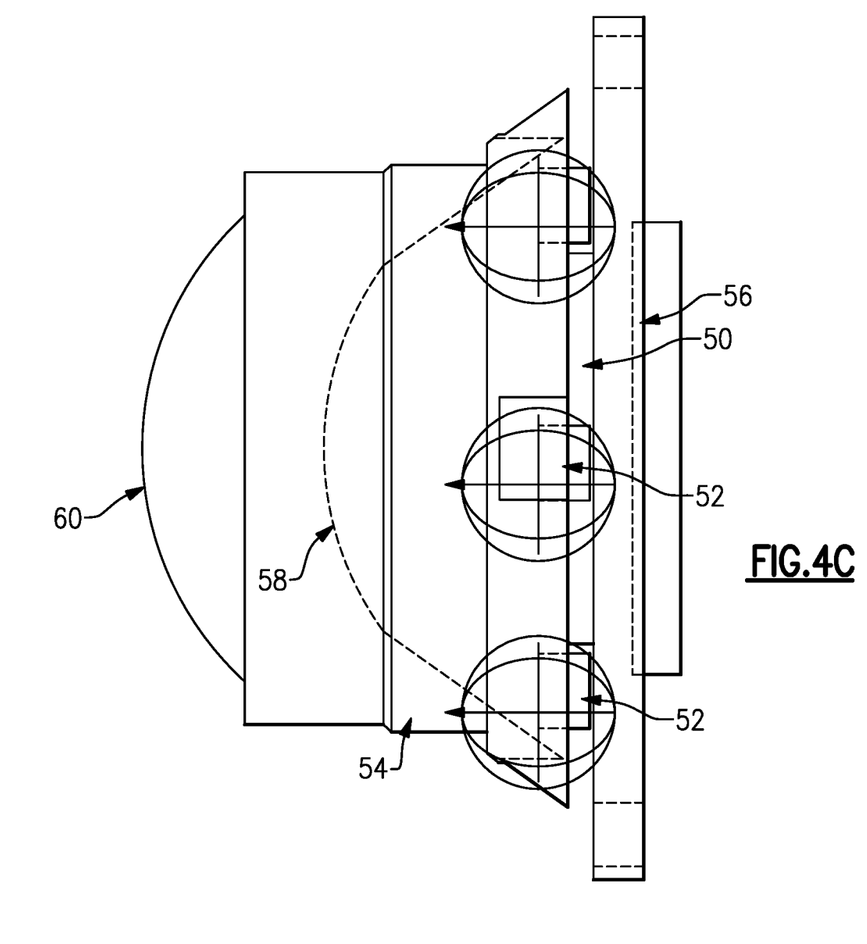
FIG. 4C shows a side view of one embodiment of the system of the present disclosure as shown in FIG. 4A and FIG. 4B.

Referring to FIG. 4A, a bottom view of one embodiment of the system of the present disclosure as shown in FIG. 4B and FIG. 4C is shown. More particularly, a receiver area 50 located on the circuit card assembly 56, where the receiver may be a focal plane array. In one embodiment the receiver comprises 400 by 400 pixels. A series of LEDs 52 are provided to produce additional illumination for the receiver. The array size can vary from 25 by 25 to 1000 by 1000 depending on the application field of view and resolution requirements.

Referring to FIG. 4B, a perspective view of one embodiment of the system of the present disclosure as shown in FIG. 4A and FIG. 4C is shown. More particularly, in certain embodiments of the system of the present disclosure, a lambertian lens retainer ring 54 is also present. The items illustrated in FIG. 4B are the LED 52, sensor array 50 and the circuit card assembly with supporting electronics 56.

Referring to FIG. 4C, a side view of one embodiment of the system of the present disclosure as shown in FIG. 4A and FIG. 4B is shown. More particularly, in some embodiments, a narrow band dichroic filter coating 58 is present on the inside of the last lens element. This is in combination with the use of lambertian scattering lens retaining ring 54 in one embodiment of the present disclosure. In certain embodiments, illumination is provided by four LEDs 52. This view provides the cross-section relation of the dome mirror effect between the LEDs 52, the narrow band dichroic filter 58 acting as a mirror for the LED energy and the mirrored lens retaining ring 54.

Figure 5A:
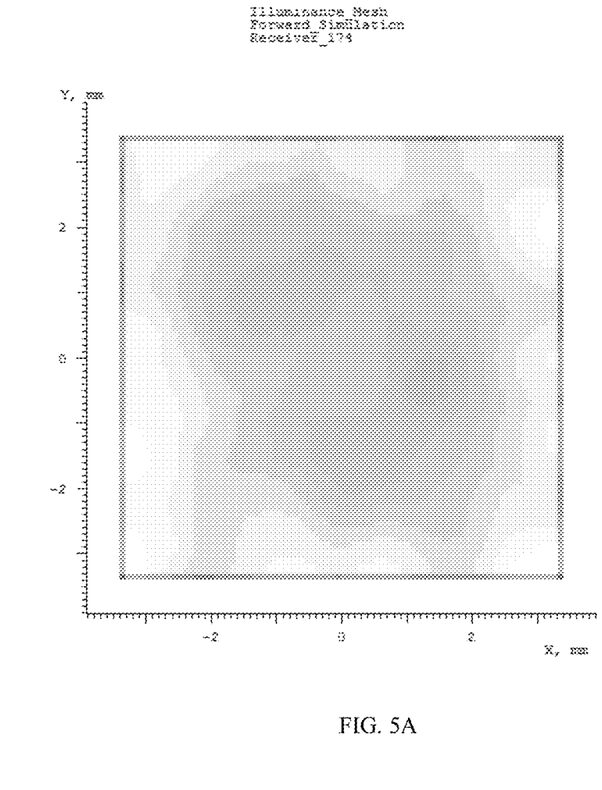
FIG. 5A is a plot of illumination performance for one embodiment of the present disclosure.
Figure 5B:
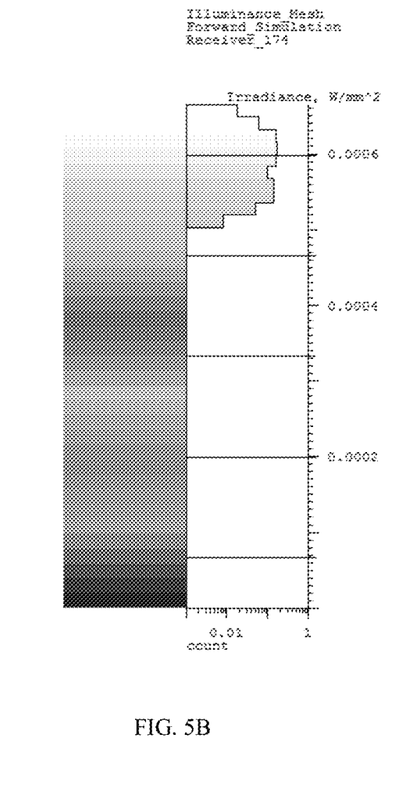
FIG. 5B is a plot of illumination performance for one embodiment of the present disclosure.

Referring to FIG. 5A, a plot of illumination performance for one embodiment of the present disclosure is shown. Referring to FIG. 5B, a plot of illumination performance for one embodiment of the present disclosure is shown. More specifically, one embodiment of the present disclosure provides greater than 10% efficiency and greater than 50% uniformity. The peak to valley energy distribution is approximately 50%.

According to one exemplary embodiment, the present seeker system is used in laser guided munitions. For example, a semi-active laser (SAL) seeker guidance system directs a munition to a target based on light reflected from the target. According to one example, an operator points a laser designator at the target, wherein the laser radiation bounces off the target and is scattered in multiple directions. The guided munition is launched towards the target and as it approaches the target, some of the reflected laser energy from the target is detected by the seeker system. The detected laser energy is used to adjust the guided munition toward the source of the reflected energy. The present system allows for operation at low reflection signals without heavier and larger amplifiers by using the additional light energy from the radiation sources to bias the preamplifiers.

In certain embodiments of the present disclosure, the calculation of a threshold value will be a range established for probable threshold values during the design phase of the sensor. When the actual parts are manufactured there will be some variability so the exact value for a desired threshold will be determined during a calibration phase. The measurement criteria will be the minimum amount of total background current for which the FPA does not experience any sensitivity or speed degradation. The desired threshold may also vary with temperature.

Figure 6A:
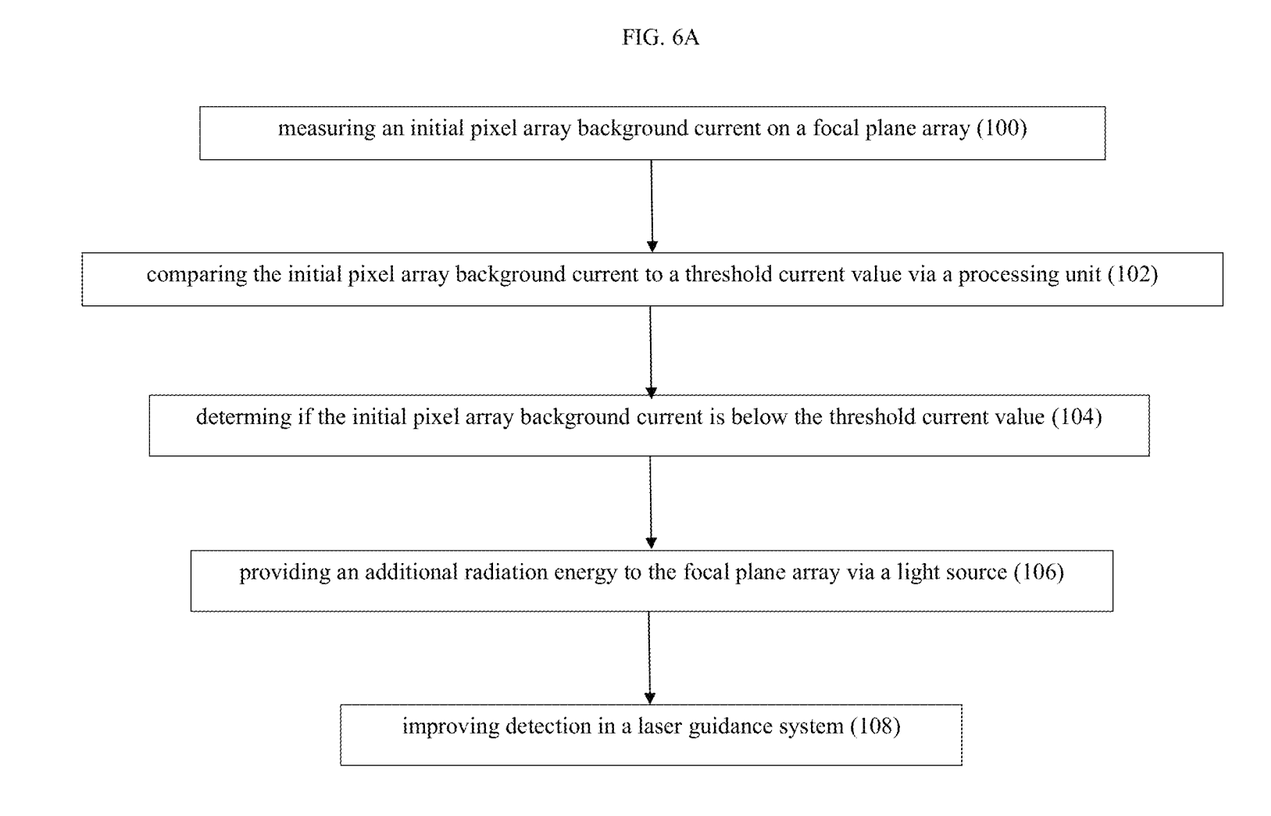
FIG. 6A is a flowchart of one embodiment of the method according to the principles of the present disclosure.

Referring to FIG. 6A, one embodiment of a method improving detection in a laser guidance system is shown. More specifically, in one embodiment, the method comprises measuring an initial pixel array background current on a focal plane array 100; and comparing the initial pixel array background current to a threshold current value via a processing unit 102. The method further comprises determining if the initial pixel array background current is below the threshold current value 104, providing additional radiation energy to the focal plane array via a light source 106, all to improve detection in the laser guidance system 108.

Figure 6B:
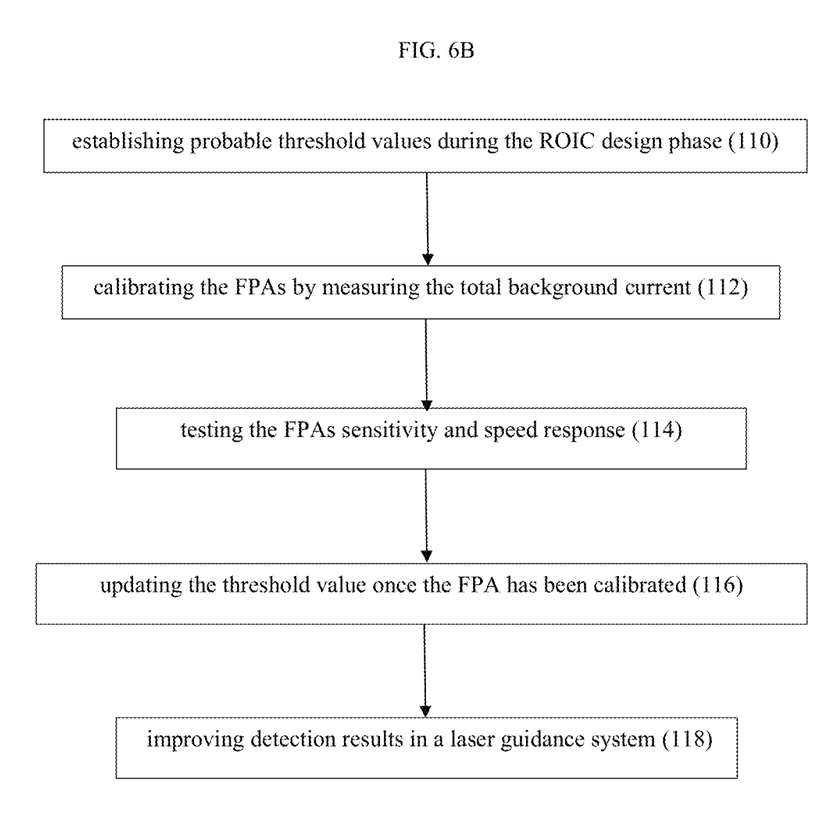
FIG. 6B is a flowchart of one embodiment of the method of determining the threshold current value according to the principles of the present disclosure.

Referring to FIG. 6B, one embodiment of a method of determining the threshold current value is shown. More specifically, in one embodiment, the process for determining the desired threshold comprises establishing probable threshold values during the ROIC design phase 110; calibrating the FPAs by measuring the total background current 112, and then testing the FPAs sensitivity and speed response 114; updating the threshold value once the FPA has been calibrated 116 to improve detection results in a laser guidance system 118. When in use, the system will measure the total background current (scene+LED inserted energy (if any), and if the value is not above threshold more energy will be added, e.g., with LEDs.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for improving detection in a laser guidance system, comprising:
   measuring an initial pixel array background current on a focal plane array;
   comparing the initial pixel array background current to a threshold current value via a processing unit; and
   if the initial pixel array background current is below the threshold current value, providing an additional radiation energy to the focal plane array via a light source, thereby improving detection in the laser guidance system.

2. The method for improving detection according to claim 1, further comprising updating the initial pixel array background current at a frequency of about 10 kHz.

3. The method for improving detection according to claim 1, further comprising converting the initial pixel array background current to a digital signal that is provided as a serial peripheral interface read-only register to at least one processing unit.

4. The method for improving detection according to claim 3, where the serial peripheral interface read-only register is read out at greater than about 20 kHz with a serial peripheral interface clock at about 1 MHz.

5. The method for improving according to claim 1, further comprising a read out integrated circuit (ROTC) in communication with the focal plane array.

6. The method for improving detection according to claim 5, wherein the ROIC uses a ROIC direct injection or a buffered direct injection pixel input configuration for each of a plurality of pixels in the focal plane array.

7. The method for improving detection according to claim 5, further comprising determining the threshold current value comprising:
   establishing probable threshold current values during the read out integrated circuit (ROIC) design phase;
   calibrating the focal plane array by measuring the total background current;
   testing the sensitivity and speed response for the focal plane array; and
   updating the threshold current value once the focal plane array has been calibrated.

8. The method for improving detection according to claim 1, further comprising detecting, via the focal plane array, a laser pulse from a laser source having a pulse width of 10 ns or less.

9. A semi active laser seeker, comprising:
   a focal plane array located within a housing and configured to receive radiation signals of a scene and configured to provide an initial pixel array background current value;
   a processing unit configured to compare the initial pixel array background current value to a threshold current value and when the initial pixel array background current is below the threshold current value to determine an additional amount of radiation energy; and
   one or more radiation sources located within the housing for providing the additional radiation energy to the focal plane array to reach the threshold current value.

10. The semi active laser seeker according to claim 9, further comprising a lambertian lens retainer for directing the radiation sources.

11. The semi active laser seeker according to claim 9, wherein the radiation sources are laser emitting diodes.

12. The semi active laser seeker according to claim 9, further comprising one or more lenses in the housing that receive the incoming radiation signals wherein one of the one or more lenses comprises a narrow band dichroic filter.

13. The semi active laser seeker according to claim 9, wherein the processing unit comprises at least one microcontroller.

14. The semi active laser seeker according to claim 9, wherein the processing unit comprises a serial peripheral interface.

15. The semi active laser seeker according to claim 9, wherein the focal plane array comprises a sensor and a read out integrated circuit.

* * * * *